US012770026B2

(12) United States Patent
Kaur et al.

(10) Patent No.: US 12,770,026 B2
(45) Date of Patent: Oct. 20, 2026

(54) SYSTEMS AND METHODS FOR GENERATING CUSTOM INDUSTRY CLASSIFICATIONS

(71) Applicant: JPMORGAN CHASE BANK, N.A., New York, NY (US)

(72) Inventors: Simerjot Kaur, Jersey City, NJ (US); Andrea Stefanucci, Hoboken, NJ (US); Patrick C. Jones, Stamford, CT (US); William N. Lai, New York, NY (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 635 days.

(21) Appl. No.: 18/348,874

(22) Filed: Jul. 7, 2023

(65) Prior Publication Data

US 2024/0028921 A1 Jan. 25, 2024

Related U.S. Application Data

(60) Provisional application No. 63/369,160, filed on Jul. 22, 2022.

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS 7,613,687 B2 * 11/2009 Nye .................... G06F 16/9538
2017/0300862 A1 * 10/2017 Bhadouria ............. G06N 20/00
(Continued)

OTHER PUBLICATIONS

Urmetzer, Florian, Andy Neely, and Veronica Martinez. "Business Ecosystems: Towards a Classification Model." Cambridge Service Alliance (2017). (Year: 2017).*
(Continued)

*Primary Examiner* — Uyen T Le
(74) *Attorney, Agent, or Firm* — GREENBERG TRAURIG LLP

(57) ABSTRACT

A method for generating custom industry classifications may include a classification computer program receiving standard industry classifications, standard industry descriptions, custom industry classifications, custom industry descriptions, and a mapping of the custom industry classifications to the standard industry classifications; generating a dataset comprising standard industry descriptions as inputs and custom industry classifications as outputs; converting the standard industry descriptions and unmapped portions of the custom industry descriptions to vector representations; performing similarity matching on the vector representations of the standard industry descriptions and the vector representations of the unmapped portions; assigning each of the unmapped portions of the custom industry descriptions to one of the standard industry descriptions based on the similarity matching; training a supervised classifier using the dataset and a plurality of startup company descriptions for a plurality of startup companies as inputs; and outputting a custom classification for each of the plurality of startup companies.

20 Claims, 3 Drawing Sheets

(56) References Cited

U.S. PATENT DOCUMENTS

| | | | | |
|---|---|---|---|---|
| 2017/0344902 | A1* | 11/2017 | Shacham | G06N 20/00 |
| 2020/0279171 | A1* | 9/2020 | Mazzoleni | G06F 16/36 |
| 2021/0065569 | A1* | 3/2021 | Arvindam | G06F 40/30 |

OTHER PUBLICATIONS

Bertels, Koen, et al. "Qualitative company performance evaluation: Linear discriminant analysis and neural network models." European Journal of Operational Research 115.3 (1999): 608-615. (Year: 1999).*

Dörr, Julian Oliver. "Mapping Technologies to Business Models. An Application to Clean Technologies and Entrepreneurship." An Application to Clean Technologies and Entrepreneurship (May 2022): 22-057. (Year: 2022).*

Yang SY, Liu FC, Zhu X, Yen DC. A graph mining approach to identify financial reporting patterns: an empirical examination of industry classifications. Decision Sciences. Aug. 2019;50(4):847-76. (Year: 2019).*

* cited by examiner

SYSTEMS AND METHODS FOR GENERATING CUSTOM INDUSTRY CLASSIFICATIONS

RELATED APPLICATIONS

This application claims priority to, and the benefit of, U.S. Provisional Patent Application Ser. No. 63/369,160, filed Jul. 22, 2022, the disclosure of which is hereby incorporated, by reference, in its entirety.

BACKGROUND OF THE INVENTION

1. Field of the Invention

Embodiments relate to systems and methods for generating custom industry classifications.

2. Description of the Related Art

There is a large number of startup companies and identifying which industry each startup company belongs to, as well as what products and services these startup companies are involved in, is critical in performing industry analysis such as general industry economics, industry participants, competition, distribution and buying patterns, etc. Manually reviewing various details about each startup company and identifying which industry the startup company belongs to, as well as the products and services these startup companies are involved in, involves a significant amount of labor and are limited by a human's capacity of reviewing all the available information.

SUMMARY OF THE INVENTION

Systems and methods for generating custom industry classifications are disclosed. In one embodiment, a method for generating custom industry classification may include: (1) receiving, by an industry classification computer program executed by an electronic device, standard industry classifications and standard industry descriptions; (2) receiving, by the industry classification computer program, custom industry classifications, custom industry descriptions, and a mapping of the custom industry classifications to the standard industry classifications, wherein the mapping maps a first portion of the custom industry classifications to the standard industry classifications; (3) generating, by the industry classification computer program, a dataset comprising standard industry descriptions as inputs and custom industry classifications as outputs; (4) converting, by the industry classification computer program, the standard industry descriptions and unmapped portions of the custom industry descriptions to vector representations; (5) performing, by the industry classification computer program, similarity matching between the vector representations of the standard industry descriptions and the vector representations of the unmapped portions of the custom industry descriptions; (6) assigning, by the industry classification computer program, each of the unmapped portions of the custom industry descriptions to one of the standard industry descriptions based on the similarity matching; (7) training, by the industry classification computer program, a supervised classifier using the dataset and a plurality of startup company descriptions for a plurality of startup companies as inputs; and (8) outputting, by the industry classification computer program, a custom classification for each of the plurality of startup companies.

In one embodiment, the standard industry descriptions may be received from one or more third parties or commercial databases.

In one embodiment, the mapping may be provided by a subject matter expert.

In one embodiment, the industry classification computer program converts the standard industry descriptions and the custom industry descriptions to vector representations by using a pre-trained large language model to encode the standard industry descriptions and the custom industry descriptions into high dimensional distributed vector representations.

In one embodiment, the industry classification computer program uses cosine similarly to perform the similarity matching.

In one embodiment, the method may also include: retrieving, by a product/service classification computer program, a plurality of product/service descriptions for the custom industry classifications; converting, by the product/service classification computer program, the product/service descriptions and the startup company descriptions to vector representations; performing, by the product/service classification computer program, similarity matching between the vector representations of the product/service descriptions for the custom industry classifications and the vector representations of the startup company descriptions; and outputting, by the product/service classification computer program, one of the product/service descriptions for each industry that the startup company participates based on the similarity matching.

In one embodiment, the startup company descriptions may be received by scraping public websites for the startup companies.

According to another embodiment, a system may include an electronic device comprising a computer processor and executing an industry classification computer program; a first database comprising standard industry classifications and standard industry descriptions; and a second database comprising custom industry classifications, custom industry descriptions, and a mapping of the custom industry classifications to the standard industry classifications, wherein the mapping maps a first portion of the custom industry classifications to the standard industry classifications. The industry classification computer program receives the standard industry classifications and the standard industry descriptions from the first database, receives the custom industry classifications, the custom industry descriptions, and the mapping of the custom industry classifications to the standard industry classifications, generates a dataset comprising standard industry descriptions as inputs and custom industry classifications as outputs, converts the standard industry descriptions and unmapped portions of the custom industry descriptions to vector representations, performs similarity matching between the vector representations of the standard industry descriptions and the vector representations of the unmapped portions of the custom industry descriptions; assigns each of the unmapped portions of the custom industry descriptions to one of the standard industry descriptions based on the similarity matching, trains a supervised classifier using the dataset and a plurality of startup company descriptions for a plurality of startup companies as inputs, and outputs a custom classification for each of the plurality of startup companies.

In one embodiment, the standard industry descriptions may be received from one or more third parties or commercial databases.

In one embodiment, the mapping may be provided by a subject matter expert.

In one embodiment, the industry classification computer program converts the standard industry descriptions and the custom industry descriptions to vector representations using a pre-trained large language model to encode the standard industry descriptions and the custom industry descriptions into high dimensional distributed vector representations.

In one embodiment, wherein the industry classification computer program uses cosine similarly to perform the similarity matching.

In one embodiment, the system may also include a product/service classification computer program executed by the electronic device that retrieves a plurality of product/service descriptions for the custom industry classifications, converts the product/service descriptions and the startup company descriptions to vector representations, performs similarity matching between the vector representations of the product/service descriptions for the custom industry classifications and the vector representations of the startup company descriptions, and outputs one of the product/service descriptions for each industry that the startup company participates based on the similarity matching.

In one embodiment, the startup company descriptions may be received by scraping public websites for the startup companies.

According to another embodiment, a non-transitory computer readable storage medium may include instructions stored thereon, which when read and executed by one or more computer processors, cause the one or more computer processors to perform steps comprising: receiving standard industry classifications and standard industry descriptions; receiving custom industry classifications, custom industry descriptions, and a mapping of the custom industry classifications to the standard industry classifications, wherein the mapping maps a first portion of the custom industry classifications to the standard industry classifications and wherein the mapping may be provided by a subject matter expert; generating a dataset comprising standard industry descriptions as inputs and custom industry classifications as outputs; converting the standard industry descriptions and unmapped portions of the custom industry descriptions to vector representations; performing similarity matching between the vector representations of the standard industry descriptions and the vector representations of the unmapped portions of the custom industry descriptions; assigning each of the unmapped portions of the custom industry descriptions to one of the standard industry descriptions based on the similarity matching; training a supervised classifier using the dataset and a plurality of startup company descriptions for a plurality of startup companies as inputs; and outputting a custom classification for each of the plurality of startup companies.

In one embodiment, the standard industry descriptions may be received from one or more third parties or commercial databases.

In one embodiment, the standard industry descriptions and the custom industry descriptions may be converted to vector representations by using a pre-trained large language model to encode the standard industry descriptions and the custom industry descriptions into high dimensional distributed vector representations.

In one embodiment, the similarity matching may be performed using cosine similarly.

In one embodiment, the non-transitory computer readable storage medium may also include instructions stored thereon, which when read and executed by one or more computer processors, cause the one or more computer processors to perform steps comprising: retrieving a plurality of product/service descriptions for the custom industry classifications; converting the product/service descriptions and the startup company descriptions to vector representations; performing similarity matching between the vector representations of the product/service descriptions for the custom industry classifications and the vector representations of the startup company descriptions; and outputting one of the product/service descriptions for each industry that the startup company participates based on the similarity matching.

In one embodiment, the startup company descriptions may be received by scraping public websites for the startup companies.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
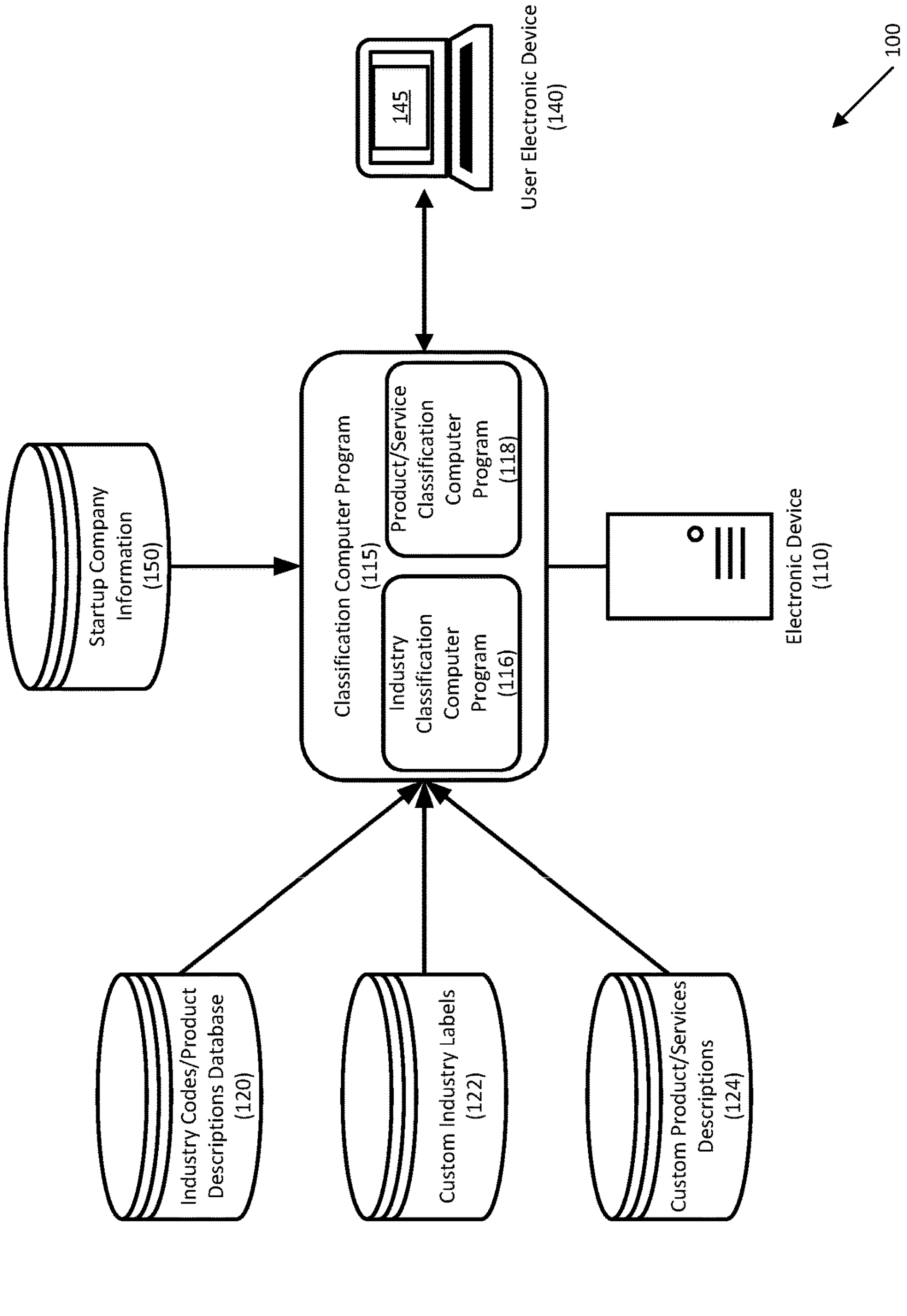
FIG. 1 illustrates a system for generating custom industry classifications according to an embodiment.

Embodiments relate to systems and methods for generating custom industry classifications.

Determining the industry to which a company belongs and what products and services the company is involved in has long been considered a highly specialized human cognitive decision making process with important applications. Knowledge of a company's industry, products, and services helps in performing industry analysis about the company like general industry economics, industry participants, competition, distribution and buying patterns, etc.

Due to the interdisciplinary nature of the products that companies are creating, a majority of companies belong to more than one industry. For instance, a company building an educational platform on a mobile app may belong to three industries: education, software and mobile applications. Moreover, for a publicly traded company, the industry to which the company belongs is public information, but for private companies, on the other hand, it is far more difficult to determine the industry to which an organization belongs.

Embodiments may classify a company's industries, products, and services in an automated manner by building a hybrid deep learning-based hierarchical classifier. For example, embodiments may use a novel algorithm that leverages recent advances in representation learning to build a hybrid multi-class classifier along with a targeted multi-label classifier which predicts which industries each company belongs to and which products and services the company builds within each industry by only using company's description as input.

Embodiments provide a cross-cutting capability that leverages deep learning and natural language processing to perform natural language understanding of startup company information, and to classify the industry to which the startup company belong, and identify the products and services that the startup company provides. Embodiments may use a combination of supervised learning and unsupervised learning to train machine learning models.

Embodiments may use a dataset that includes various details of startup companies, such as a brief description about what the startup company does, some keywords focusing on what areas the startup company is involved in, a defined industry focus, etc. The organization may have a list of custom industries and corresponding products and services that the startup companies might be involved in, as well as custom definitions of each industry as well as product/service.

For example, embodiments may first construct a labeled dataset for training a multi-class industry classifier by leveraging human subject matter experts (SMEs) and unsupervised techniques. In one embodiment, a predefined set of custom named industries and products and services within each industry may be provided by the experts. The experts may also provide a description for each industry as well as the product and services taxonomy. Using this information, embodiments may build a high dimensional vector representation for each company using its description as available input data and predict, for example, the top three industries in which the company may belong.

In order to correctly classify the startup companies into an industry, in the first step embodiments may construct a supervised dataset with input as company descriptions and output as the custom industry labels. To construct this dataset, the defined industries may be mapped to the custom industries. This mapping results in a supervised dataset for a portion of the custom industry labels.

For the remaining industry labels, embodiments may use an unsupervised approach to generate the labeled dataset. For example, embodiments may perform a similarity match between company descriptions and business provided definitions for the remaining industry labels. Both of the descriptions may be converted into a high-dimensional vector representation using, for example, the Roberta model, and then performing, for example, cosine similarity between the vector representations. The particular industry label may be defined if the similarity between both the definitions is above a threshold, such as 0.85. Any suitable value for the threshold may be used as is necessary and/or desired. In one embodiment the threshold may be static, may be dynamic (e.g., based on the industry, etc.).

Next, embodiments may train a supervised classifier using the dataset and with startup company descriptions as an input. The input description may be first converted into a high-dimensional vector representation using, for example, the Roberta model, and may then be passed as input features into the classification model. The classifier may output any desired number of industry classification, such as one, two, three, etc. In one embodiment, the classifier may output the top three industries.

Next, embodiments may construct a targeted multi-class products and services classifier by building a high dimensional vector representation for each company as well as a predefined products and services taxonomy using descriptions of the products and services as inputs, and generating similarity scores between products and services which are then used to identify, for example, the top two products and services that the company might be involved.

Embodiments may use an unsupervised approach to identify the products/services for each startup company. In this approach, for each industry, embodiments may perform a similarity match between the company descriptions and business provided definitions for the corresponding products/services within that industry. For example, both of the descriptions may be converted into a high-dimensional vector representation using, for example, the Roberta model, and then cosine similarity between vector representation may be performed.

In one embodiment, the classifier may output the top three industries to which a startup belongs, as well as the top two products or services that the company provides.

Referring to FIG. 1, a system for generating custom industry classifications is disclosed according to one embodiment. System 100 may include electronic device 110, which may be a server (e.g., cloud-based and/or physical), computers, etc. Electronic device 110 may execute industry classification computer program 115, which may interface with browser/application 145 executed by user electronic device 140, database of company industry classifications and products/services descriptions 120, custom industry labels database 122, and custom products/services database 124. Industry classification computer program 115 may also receive startup company information from startup company information database 150.

Database of company industry classifications and products/services descriptions 120 may include industry classifications that may be provided a third party. For example, each industry may be associated with a standard industry classification, and each product/services may be associated with a standard industry description.

In one embodiment, the standard industry classification and descriptions may not need to be adopted by an entire industry, but may instead be classifications and descriptions used by a third party.

Custom industry labels database 122 may include SME-defined industry classifications and SME-defined industry descriptions. For example, a SME for an organization may define certain custom industry classifications that the organization will use instead of the standard industry classifications.

Custom products/services description database 124 may include SME-defined product/services descriptions.

Industry classification computer program 115 may use industry classifier 116 to identify one or more industry to which the startup company belongs. In one embodiment, industry classifier 116 may be trained with a dataset of startup company descriptions as an input using supervised learning.

Industry classification computer program 115 may also use product/service classification computer program 118 to identify one or more product or service that the startup company may provide. Product/service classification computer program 118 may be trained with product/services descriptions for the industry classification using, for example, unsupervised learning.

Figure 2:
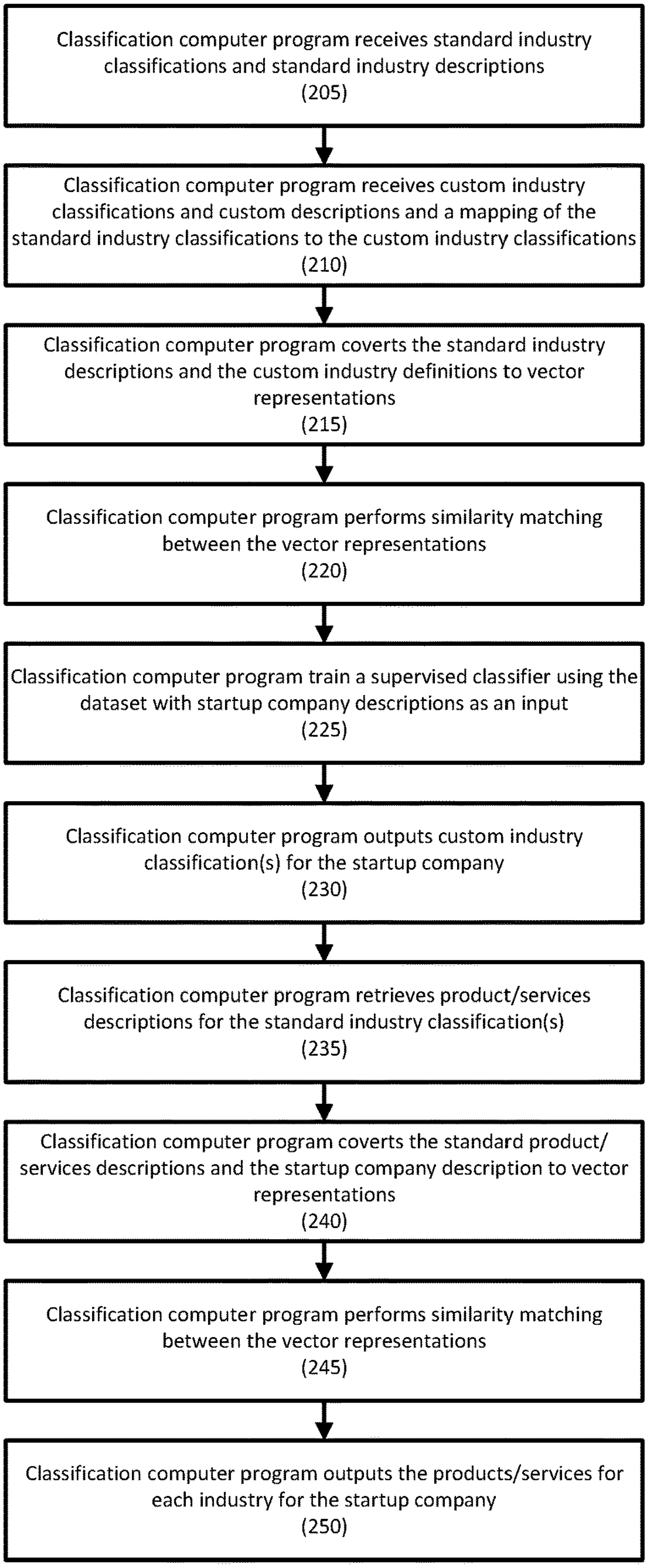
FIG. 2 illustrates a method for generating custom industry classifications according to an embodiment.

Referring to FIG. 2, a method for generating custom industry classifications is disclosed according to one embodiment.

In step 205, a classification computer program, such as an industry classification computer program executed by an electronic device, may receive standard industry classifications and standard industry descriptions for companies. The standard industry classifications and standard industry descriptions may be from one or more third parties, commercial databases, etc.

In step 210, the classification computer program may receive custom industry classifications and custom industry descriptions and a mapping of the custom industry classifications to the standard industry classifications, or vice-versa. For example, SMEs may provide the mapping. Through this mapping, embodiments may generate a labeled dataset containing standard industry descriptions as inputs and custom industry classifications as outputs.

In one embodiment, the mapping may cover a first portion of the custom industry classifications. As an example, the mapping may cover 75% of the custom industry classifications, while the remaining 25% of the custom industry classifications may be unassigned. These numbers are exemplary only; the actual numbers may depend on the data.

In step 215, the classification computer program may convert the standard industry descriptions and the unassigned portion of the custom industry description to vector representations. For example, a pre-trained large language model may be used to encode the standard industry descriptions and the custom industry descriptions into high dimensional distributed vector representations. The key guiding principle behind the high dimensional vector representation is that similar sentences, phrases, or words within a similar context should map closely to each other in a high-dimensional space, and sentences, phrases, or words that are very different should map far away from each other.

In step 220, the classification computer program may perform similarity matching between the vector representations. For example, the similarity scores between the two vector representations using cosine similarity. For example, similarity matching may be provided by the following equation:

$$\cos(comp, \text{ind\_code}) = \frac{\text{comp\_vec} \cdot \text{ind\_vec}}{\|\text{comp\_vec}\| \cdot \|\text{ind\_vec}\|}$$

Other methods of similarity matching may be performed as is necessary and/or desired.

The standard industry classification that has a description with the highest similarity score to a custom industry description and is above a given threshold may then be assigned to, or associated with, that custom industry classification. The process may be repeated until all custom industry classifications have been assigned to, or associated with, a standard industry classification.

In step 225, the classification computer program may train a supervised classifier using the dataset and startup company descriptions as input. For example, the startup company descriptions may be converted into vector representations.

In one embodiment, the startup company descriptions may be sourced from licensed data, by scraping public startup company websites, etc. The startup company descriptions may provide information on the industry for the startup company, the types of goods or services the startup company provides, etc.

The custom industry descriptions may be descriptions provided by the SMEs and may identify how a custom industry name (also defined by the SMEs) corresponds to various products/services that are part of that industry as a whole.

In step 230, using the trained supervised classifier, the classification computer program may output the custom industry classification(s) for the startup company.

In step 235, a classification computer program, such as a product/service classification computer program, may retrieve product/services descriptions for the custom industry classification(s) for the startup companies, and, in step 240, may covert the product/services descriptions and the startup company description to vector representations.

In step 245, the classification computer program may perform similarity matching between the vector representations. For example, the industry classification computer program may use cosine matching or a similar similarity matching method.

In step 250, the classification computer program may output the custom products/services for each industry in which the startup company participates.

Once the custom products/services are output, the classification computer program may receive feedback from users. The feedback may be used to retain the supervised classifier.

Figure 3:
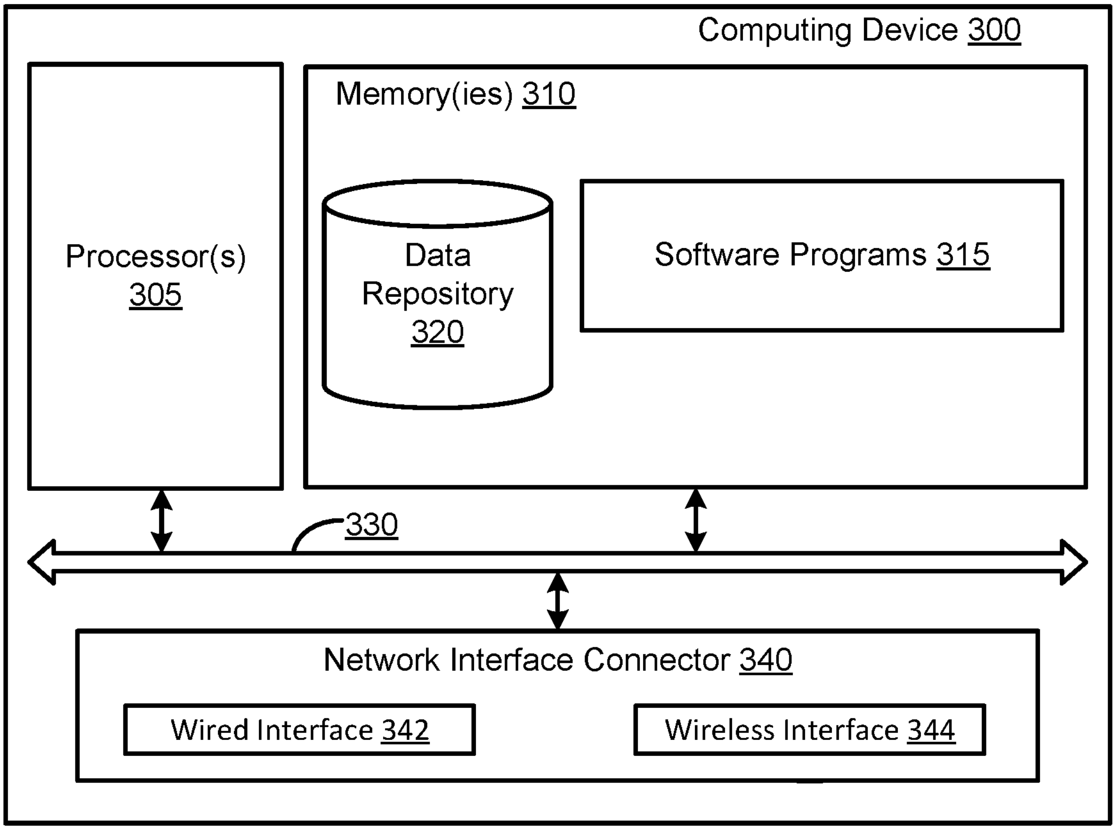
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating custom industry classification, comprising:

receiving, by an industry classification computer program executed by an electronic device, standard industry classifications and standard industry descriptions;

receiving, by the industry classification computer program, custom industry classifications, custom industry descriptions, and a mapping of the custom industry classifications to the standard industry classifications, wherein the mapping maps a first portion of the custom industry classifications to the standard industry classifications;

generating, by the industry classification computer program, a dataset comprising standard industry descriptions as inputs and custom industry classifications as outputs;

converting, by the industry classification computer program, the standard industry descriptions and unmapped portions of the custom industry descriptions to vector representations;

performing, by the industry classification computer program, similarity matching between the vector representations of the standard industry descriptions and the vector representations of the unmapped portions of the custom industry descriptions;

assigning, by the industry classification computer program, each of the unmapped portions of the custom industry descriptions to one of the standard industry descriptions based on the similarity matching;

training, by the industry classification computer program, a supervised classifier using the dataset and a plurality of startup company descriptions for a plurality of startup companies as inputs; and outputting, by the industry classification computer program, a custom classification for each of the plurality of startup companies.

2. The method of claim 1, wherein the standard industry descriptions are received from one or more third parties or commercial databases.

3. The method of claim 1, wherein the mapping is provided by a subject matter expert.

4. The method of claim 1, wherein the industry classification computer program converts the standard industry descriptions and the custom industry descriptions to vector representations by using a pre-trained large language model to encode the standard industry descriptions and the custom industry descriptions into high dimensional distributed vector representations.

5. The method of claim 1, wherein the industry classification computer program uses cosine similarly to perform the similarity matching.

6. The method of claim 1, further comprising:

retrieving, by a product/service classification computer program, a plurality of product/service descriptions for the custom industry classifications;

converting, by the product/service classification computer program, the product/service descriptions and the startup company descriptions to vector representations;

performing, by the product/service classification computer program, similarity matching between the vector representations of the product/service descriptions for the custom industry classifications and the vector representations of the startup company descriptions; and outputting, by the product/service classification computer program, one of the product/service descriptions for each industry that the startup company participates based on the similarity matching.

7. The method of claim 1, wherein the startup company descriptions are received by scraping public websites for the startup companies.

8. A system, comprising:

an electronic device comprising a computer processor and executing an industry classification computer program;

a first database comprising standard industry classifications and standard industry descriptions; and a second database comprising custom industry classifications, custom industry descriptions, and a mapping of the custom industry classifications to the standard industry classifications, wherein the mapping maps a first portion of the custom industry classifications to the standard industry classifications;

wherein:

the industry classification computer program receives the standard industry classifications and the standard industry descriptions from the first database;

the industry classification computer program receives the custom industry classifications, the custom industry descriptions, and the mapping of the custom industry classifications to the standard industry classifications;

the industry classification computer program generates a dataset comprising standard industry descriptions as inputs and custom industry classifications as outputs;

the industry classification computer program converts the standard industry descriptions and unmapped portions of the custom industry descriptions to vector representations;

the industry classification computer program performs similarity matching between the vector representations of the standard industry descriptions and the vector representations of the unmapped portions of the custom industry descriptions;

the industry classification computer program assigns each of the unmapped portions of the custom industry descriptions to one of the standard industry descriptions based on the similarity matching;

the industry classification computer program, trains a supervised classifier using the dataset and a plurality of startup company descriptions for a plurality of startup companies as inputs; and the industry classification computer program outputs a custom classification for each of the plurality of startup companies.

9. The system of claim 8, wherein the standard industry descriptions are received from one or more third parties or commercial databases.

10. The system of claim 8, wherein the mapping is provided by a subject matter expert.

11. The system of claim 8, wherein the industry classification computer program converts the standard industry descriptions and the custom industry descriptions to vector representations by using a pre-trained large language model to encode the standard industry descriptions and the custom industry descriptions into high dimensional distributed vector representations.

12. The system of claim 8, wherein the industry classification computer program uses cosine similarly to perform the similarity matching.

13. The system of claim 8, further comprising a product/service classification computer program executed by the electronic device, wherein:

the product/service classification computer program retrieves a plurality of product/service descriptions for the custom industry classifications;

the product/service classification computer program converts the product/service descriptions and the startup company descriptions to vector representations;

the product/service classification computer program performs similarity matching between the vector representations of the product/service descriptions for the custom industry classifications and the vector representations of the startup company descriptions; and the product/service classification computer program outputs one of the product/service descriptions for each industry that the startup company participates based on the similarity matching.

14. The system of claim 8, wherein the startup company descriptions are received by scraping public websites for the startup companies.

15. A non-transitory computer readable storage medium, including instructions stored thereon, which when read and executed by one or more computer processors, cause the one or more computer processors to perform steps comprising:

receiving standard industry classifications and standard industry descriptions;

receiving custom industry classifications, custom industry descriptions, and a mapping of the custom industry classifications to the standard industry classifications, wherein the mapping maps a first portion of the custom industry classifications to the standard industry classifications and wherein the mapping is provided by a subject matter expert;

generating a dataset comprising standard industry descriptions as inputs and custom industry classifications as outputs;

converting the standard industry descriptions and unmapped portions of the custom industry descriptions to vector representations;

performing similarity matching between the vector representations of the standard industry descriptions and the vector representations of the unmapped portions of the custom industry descriptions;

assigning each of the unmapped portions of the custom industry descriptions to one of the standard industry descriptions based on the similarity matching;

training a supervised classifier using the dataset and a plurality of startup company descriptions for a plurality of startup companies as inputs; and outputting a custom classification for each of the plurality of startup companies.

16. The non-transitory computer readable storage medium of claim 15, wherein the standard industry descriptions are received from one or more third parties or commercial databases.

17. The non-transitory computer readable storage medium of claim 15, wherein the standard industry descriptions and the custom industry descriptions are converted to vector representations by using a pre-trained large language model to encode the standard industry descriptions and the custom industry descriptions into high dimensional distributed vector representations.

18. The non-transitory computer readable storage medium of claim 15, wherein the similarity matching is performed using cosine similarly.

19. The non-transitory computer readable storage medium of claim 15, further including instructions stored thereon, which when read and executed by one or more computer processors, cause the one or more computer processors to perform steps comprising:

retrieving a plurality of product/service descriptions for the custom industry classifications;

converting the product/service descriptions and the startup company descriptions to vector representations;

performing similarity matching between the vector representations of the product/service descriptions for the custom industry classifications and the vector representations of the startup company descriptions; and outputting one of the product/service descriptions for each industry that the startup company participates based on the similarity matching.

20. The non-transitory computer readable storage medium of claim 15, wherein the startup company descriptions are received by scraping public websites for the startup companies.

* * * * *